2,927,926
SULFUR CONTAINING DERIVATIVE OF ISONICOTINIC ACID HYDRAZIDE

Otto Zima, Darmstadt-Eberstadt, and Fritz von Werder, Darmstadt, Germany, assignors to E. Merck Aktiengesellschaft, Darmstadt, Germany No Drawing. Application March 9, 1959
Serial No. 797,874

Claims priority, application Germany May 6, 1958

1 Claim. (Cl. 260—294.8)

The present invention relates to a novel sulfur containing derivative of isonicotinic acid hydrazide, namely, β-ethylsulfinyl-ethylsulfinyl-acetaldehyde-isonicotinic acid hydrazone of the formula

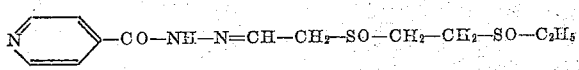

and the method of its preparation.

German Patent No. 926,248 discloses the preparation of an active tuberculostatic derivative of pyridine-4-carboxylic acid hydrazide by condensing β-methylmercaptopropionaldehyde with isonicotinic acid hydrazide and, if desired, converting the resulting β-methylmercaptopropylidene hydrazide to the corresponding sulfoxide by treatment with an oxidizing agent.

The compounds of such patent are of the following structural formulae

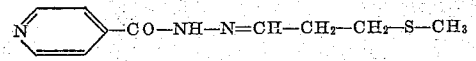

and

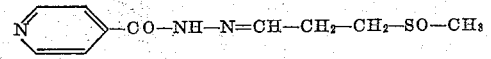

The novel isonicotinic acid hydrazide derivative according to the invention which differs from these known derivatives in the length of side chains, as well as in the provision of two sulfur atoms therein instead of one, has been found not only to possess very good tuberculostatic activity but also additional advantageous pharmacological properties, particularly, in that it is especially well tolerated in comparison to the simple isonicotinic acid hydrazide, as well as the compounds of German Patent No. 926,248.

The novel sulfur containing isonicotinic acid derivative according to the invention can be produced by condensing isonicotinic acid hydrazide with β-ethylmercaptoethylmercapto-acetaldehyde and subsequently oxidizing the thioether groups of the resulting condensation product with an oxidizing agent normally employed to oxidize thioether groups to sulfoxide groups to produce β-ethylsulfinyl-ethylsulfinyl-acetaldehyde-isonicotinic acid hydrazone. This compound can also be produced by first oxidizing β-ethylmercapto-ethylmercapto-acetaldehyde to produce β-ethylsulfinyl-ethylsulfinyl-acetaldehyde and condensing the preoxidized compound with isonicotinic acid hydrazide. Unexpectedly, the acetaldehyde group is not attacked during the preoxidation and also the sulfoxide group is not attacked under the conditions employed for the condensation. The condensations of isonicotinic acid hydrazide with β-ethylmercapto-ethylmercapto-acetaldehyde and with β-ethylsulfinyl-ethylsulfinyl-acetaldehyde proceed smoothly to produce the corresponding hydrazones which crystallize well.

The β-ethylmercapto-ethylmercapto-acetaldehyde which is used as a starting material can be prepared by reacting bromacetal with the corresponding mercaptan and hydrolysing the resulting β-ethylmercapto-ethylmercapto-acetal to the aldehyde.

The conversion of the sulfur containing compounds into the corresponding sulfoxides can be carried out with the usual oxidizing agents employed for oxidizing thioethers to sulfoxides. Especially good results are obtained when hydrogen peroxide is employed as the oxidizing agent.

The β-ethylsulfinyl-ethylsulfinyl-acetaldehyde-isonicotinic acid hydrazone according to the invention has a particularly advantageous therapeutic index; its toxicity, for example, is only about ¼ of the toxicity of the compounds of German Patent 926,248. A further advantage of the compound according to the invention is that it possesses good solubility in water and therefore is suited for intravenous injection. In view of its excellent tuberculostatic activity, the novel compound according to the invention is useful as a chemotherapeutic agent for combatting tuberculosis.

The β-ethylsulfinyl-ethylsulfinyl-acetaldehyde-isonicotinic acid hydrazone is to be used in combatting tuberculosis in substantially the same manner as the parent compound, isonicotinic acid hydrazide.

The following examples will serve to illustrate the preparation of the novel compound according to the invention.

Example 1

(a) A mixture of 46 g. of sodium in 920 cc. of absolute alcohol and 244 g. of β-ethylmercapto-ethylmercaptan was heated to boiling and 394 g. of bromacetal added thereto slowly while stirring. The mixture was then boiled for 3 hours under reflux and thereafter allowed to stand overnight. The sodium bromide precipitate off and the filtrate boiled down under vacuum. The residue was dissolved in ether and the ether solution washed and dried and the ether boiled off under vacuum. The residue obtained was fractionated under vacuum. The β-ethylmercapto-ethylmercapto-acetal boiled at 137–138° C. at a pressure of 1.2 mm. Hg.

347 g. of the β-ethylmercapto-ethylmercapto acetal were shaken for 18 hours at room temperature with 3470 cc. of 10% $H_2SO_4$. After extraction with ether, washing and drying, the product was fractionated under vacuum. The β-ethylmercapto-ethylmercapto-acetaldehyde boiled at 111–112° C. at a pressure of 0.6 mm. Hg.

(b) 214 g. of the β-ethylmercapto-ethylmercapto-acetaldehyde were introduced with stirring into a solution of 179 g. of isonicotinic acid hydrazide in 900 cc. of water warmed to 40° C. The mixture was stirred at room temperature and under ice cooling. The precipitate was filtered off on a suction filter, washed with water and recrystallized from methyl acetate. The β-ethylmercapto-ethylmercapto-acetaldehyde-isonicotinic acid hydrazone formed colorless crystals having a melting point of 108° C.

(c) 188 g. of 30% hydrogen peroxide were added to a solution of 250 g. of β-ethylmercapto-ethylmercapto-acetaldehyde-isonicotinic acid hydrazone in 1250 cc. of alcohol, taking care that the temperature of the mixture did not rise above 50° C. After 3 hours' stirring at room temperature and standing overnight, the mixture was boiled down under vacuum. β-Ethylsulfinyl-ethylsulfinyl-acetaldehyde-isonicotinic acid hydrazone of a melting point of 158–159° C. was obtained from the residue by recrystallization from absolute alcohol.

Example 2

147 g. of 30% hydrogen peroxide were introduced with stirring into a solution of 101 g. of β-ethylmercapto-ethylmercapto-acetaldehyde in 505 cc. of alcohol while cooling with ice in such a manner that the temperature did not rise above 40° C. The mixture was stirred for a further 3 hours and then allowed to stand for 16 hours. Thereafter, a solution of 84.5 g. of isonicotinic acid hydrazide in 425 cc. of water were added and the mixture stirred for another half hour. The mixture was then boiled down under vacuum. The residue upon recrystallization from 850 cc. of absolute alcohol yielded 135 g. of β-ethylsulfinyl-ethylsulfinyl-acetaldehyde - isonicotinic acid hydrazone having a melting point of 157–158° C.

We claim:
β-Ethylsulfinyl-ethylsulfinyl - acetaldehyde - isonicotinic acid hydrazone of the structural formula

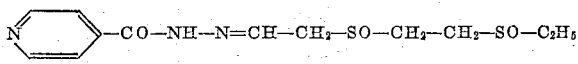

References Cited in the file of this patent
UNITED STATES PATENTS
2,734,905    Zima et al. _____ Feb. 14, 1956